(12) United States Patent
Lach et al.

(10) Patent No.: US 7,729,028 B2
(45) Date of Patent: Jun. 1, 2010

(54) METHOD TO REDUCE RF NOISE GENERATION AND REQUIRED PEAK LASER OUTPUT IN RASTER SCAN PORTABLE PROJECTORS

(75) Inventors: Lawrence E. Lach, Chicago, IL (US); Ion V. Nicolaescu, Carpentersville, IL (US)

(73) Assignee: Motorola, Inc., Schaumburg, IL (US)

( * ) Notice: Subject to any disclaimer, the term of this patent is extended or adjusted under 35 U.S.C. 154(b) by 461 days.

(21) Appl. No.: 11/839,244

(22) Filed: Aug. 15, 2007

(65) Prior Publication Data

US 2009/0046259 A1 Feb. 19, 2009

(51) Int. Cl.
*G02B 26/08* (2006.01)

(52) U.S. Cl. ............. 359/202.1; 359/198.1; 359/199.1; 359/201.2

(58) Field of Classification Search .... 359/201.2–202.1
See application file for complete search history.

(56) References Cited

U.S. PATENT DOCUMENTS

| | | | |
|---|---|---|---|
| 5,032,924 | A | 7/1991 | Brown et al. |
| 5,889,269 | A | 3/1999 | Bridgeiall et al. |
| 6,655,597 | B1 | 12/2003 | Swartz |
| 6,832,724 | B2 | 12/2004 | Yavid et al. |
| 7,042,613 | B2 | 5/2006 | Barnea et al. |
| 7,474,165 | B2 * | 1/2009 | Kato et al. .................. 331/176 |
| 2003/0122066 | A1 | 7/2003 | Dunfield |
| 2005/0167507 | A1 | 8/2005 | Swartz et al. |
| 2006/0164330 | A1 | 7/2006 | Bright et al. |
| 2006/0267858 | A1 | 11/2006 | Yun et al. |
| 2007/0097335 | A1 | 5/2007 | Dvorkis et al. |
| 2007/0138372 | A1 | 6/2007 | Klosowiak et al. |

OTHER PUBLICATIONS

Bum Jae Jeon, "PCT Search Report and Written Opinion," WIPO, ISA/KR, Korean Intellectual Property Office, Daejeon, Republic of Korea, Dec. 29, 2008.

Robert N. Dean, et al.; "Advanced Controllers for Microelectromechanical Actuators"; 2005 IEEE; Auburn, AL.

* cited by examiner

*Primary Examiner*—James Phan
(74) *Attorney, Agent, or Firm*—Ronald E. Prass, Jr.; Prass LLP

(57) ABSTRACT

A method and apparatus that projects a two-dimensional image is disclosed. The method may include emitting a laser beam, sweeping the laser beam with a first scan mirror along a first scan direction to form a scan line on the projection surface, and sweeping the scan line with a second scan mirror along a second scan direction generally orthogonal to the first scan direction to form a raster pattern of scan lines on the projection surface. The scanner for the first scan mirror is driven with a stimulus waveform, wherein the stimulus waveform has a fundamental frequency that is substantially equal to the resonance frequency of the scanner but also contains harmonics to achieve a nearly constant velocity of the laser beam spot during its scan across the projection surface. The stimulus thereby reduces peak laser output power and corresponding noise generation while maintaining image brightness and image quality.

9 Claims, 4 Drawing Sheets

METHOD TO REDUCE RF NOISE GENERATION AND REQUIRED PEAK LASER OUTPUT IN RASTER SCAN PORTABLE PROJECTORS

BACKGROUND OF THE INVENTION

1. Field of the Invention

The present invention relates to image projection systems, and in particular, to a method and apparatus for reducing RF noise generation or required laser output in an image projection system.

2. Introduction

A portable projector or micro-projector can provide an image larger than the hosting projecting device dimension. Such displays have the potential to overcome the display size limitation on mobile devices and can be used to display documents and images, for example. The displays can also help to overcome the input interface size limitation on mobile devices by displaying virtual input devices, such as keyboards. One technology used for micro-projection is laser scanning, in which red, green and blue laser beams are scanned across a surface to form a full color image. To provide the user of the device with optimum mobility and ease of use, these devices must be small in size, lightweight, and battery powered. However, the requirements necessary to achieve portability result in severe constraints on space, weight, and power dissipation, and increase the amount of heat energy generated by the components of the portable device.

In order to accommodate the brightness and image quality requirements, the conventional solutions for minimizing power consumption in laser-scanned projection require an increase in peak laser output power and peak laser drive current. This increase in laser drive current increases the generation of radio frequency (RF) noise. The effects of this additional RF noise could be particularly significant if the projector is integrated within a portable phone. The noise could exacerbate the problem of desense, or loss of receiver sensitivity, leading to a significant degradation of radio performance.

For the reasons stated above, and for other reasons stated below which will become apparent to those skilled in the art upon reading and understanding the present specification, there is a need in the art for reducing peak laser output power and associated RF noise generation in laser-scanned projection.

The scanning of the projector laser beam is achieved by one or two mirrors that reflect the beam and move in such a way as to create a raster pattern on a screen. The raster is created by a horizontal fast movement and a slower vertical movement. The vertical movement is linear, creating on the screen a spot that moves at constant velocity. The mirror creating the horizontal movement oscillates in a resonance mode which enables a much faster movement of the spot on the screen. The penalty of resonance movement is that the mirror moves as a harmonic oscillator and, consequently, the spot velocity is sinusoidal. This requires a higher light output from the lasers during the time when the mirror moves faster. The higher current required for driving the lasers during this time can generate higher RF noise. Therefore, there is a need to make the speed of the horizontal movement of the mirror essentially constant, to minimize the generation of excessive RF noise.

The patent to Barnea (U.S. Pat. No. 7,042,613) describes a method of linearizing the movement of the mirror consisting in a bouncing mechanism that reverses the movement at the end of its range. This mechanical solution complicates considerably the construction of the mirror.

The patent to Bridgelall (U.S. Pat. No. 5,889,269) describes an optical scanner for reading two-dimensional indicia such as bar code symbols and the like and includes a scan element arranged to create a two-dimensional raster pattern which may be scanned across the indicia to be read. In order to improve linearity of response in the vertical direction, perpendicular to the direction of the scan lines, the scan element is driven in that direction by a modified triangular waveform in which the amplitude and/or the phase of at least one of the harmonics has been altered. However, this prior art only applies linearization orthogonal to the fast scanning direction and not parallel to the fast scanning direction. And this prior art is only applied to improve the linearity of response within a two-dimensional raster patter across indicia to be read, and not to minimize RF noise generation associated with image projection near high RF sensitivity communications equipment.

It is the object of this invention to provide a means of reducing the laser peak power, peak laser drive current, and generated RF noise by improved linearity of the mirror movement.

SUMMARY OF THE INVENTION

A method and apparatus that projects a two-dimensional image is disclosed. The method may include emitting a laser beam, sweeping the laser beam with a first scan mirror along a first scan direction to form a scan line on the projection surface, and sweeping the scan line with a second scan mirror along a second scan direction generally orthogonal to the first scan direction to form a raster pattern of scan lines on the projection surface. The scanner for the first scan mirror is driven with a stimulus waveform, wherein the stimulus waveform has a fundamental frequency that is substantially equal to the resonance frequency of the scanner but also contains harmonics to achieve a nearly constant velocity of the laser beam spot during its scan across the projection surface. The stimulus thereby reduces peak laser output power and corresponding noise generation while maintaining image brightness and image quality.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

Figure 1:
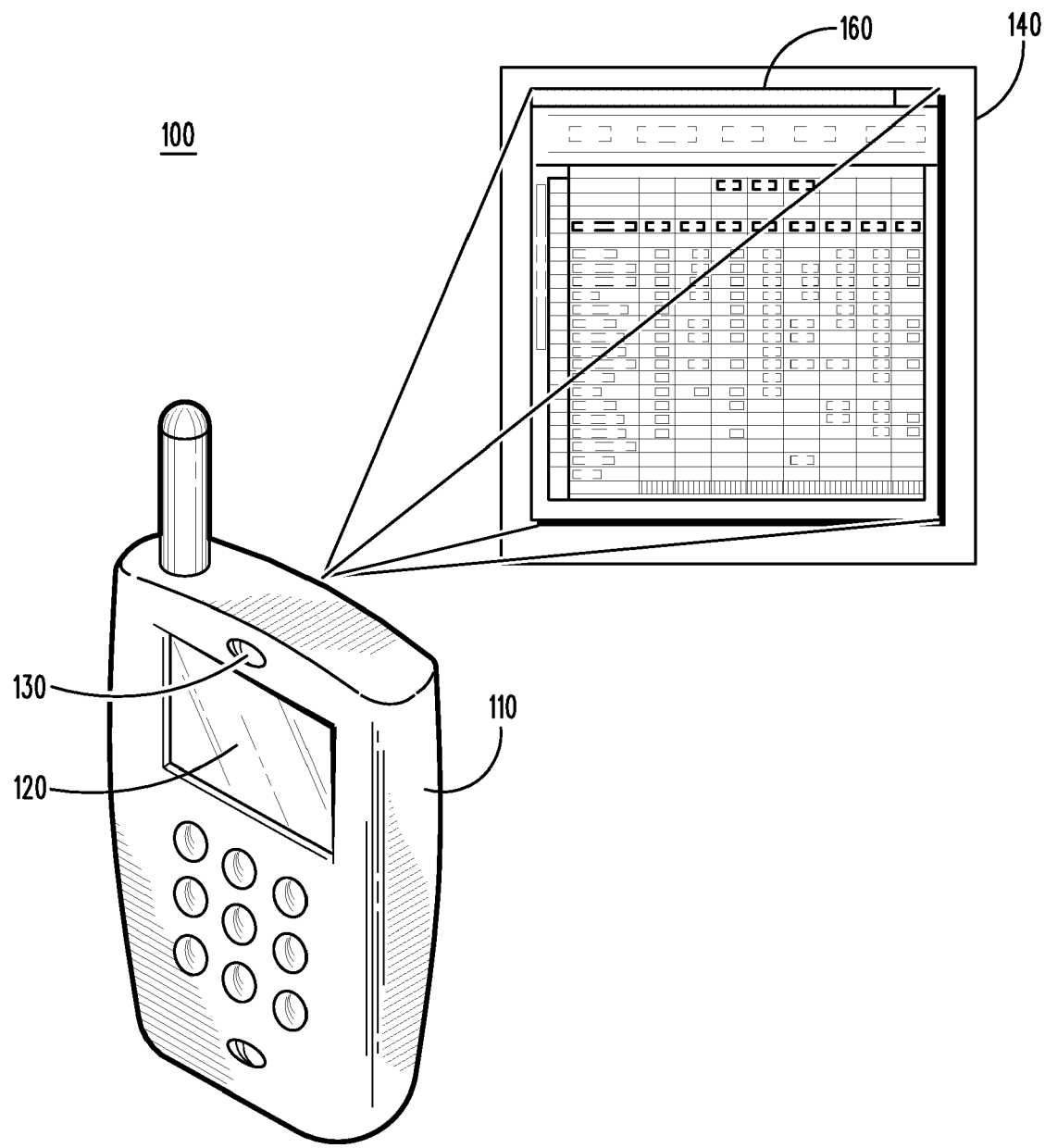
FIG. 1 is a perspective view of a electronic device projecting an image at a working distance therefrom.

FIG. 1 illustrates an exemplary diagram of an electronic device 100 for projecting a two-dimensional image in accordance with a possible embodiment of the invention. FIG. 1 generally identifies a hand-held instrument, for example, a personal digital assistant, in which a lightweight, compact, image projection arrangement 200 (FIG. 2) is mounted and operative for projecting a two-dimensional image 160 at a predetermined distance from instrument 110 and within a particular area 140. By way of example, an image 160 is situated within a working range of distances relative to the instrument 110. As shown in FIG. 1, the image 160 extends over an optical horizontal scan angle extending along the horizontal direction, and over an optical vertical scan angle extending along the vertical direction, of the image 160. As described below, the image 160 is comprised of illuminated and non-illuminated pixels on a raster pattern of scan lines swept by a scanner in the arrangement 200. The shown shape of the instrument 110 represents just one form factor of a housing in which the arrangement 110 may be implemented. The instrument can be shaped as a pen, a cellular telephone, a clamshell, a wristwatch, or any other existing or yet to be discovered shape. This compact, miniature size allows the arrangement 200 to be mounted in housings of many diverse shapes, large or small, portable or stationary, including some having an on-board display 120, a keypad, and a window through which the image is projected. While described as an image projection device it should be understood that the instrument 110 is capable of projecting a video stream, projecting text, or projecting graphics and for performing cellular phone functions such as voice and text communication. A video stream 160 is a sequence of static images which when displayed in sequence produce motion picture video. The electronic device 100 includes image projection arrangement 200 (FIG. 2) and communication devices for sending and receiving voice, text, and data.

The electronic device 100 illustrated in FIG. 1 and the image projection arrangement 200 and the related discussion are intended to provide a brief, general description of a suitable environment in which the invention may be implemented. Although not required, the invention will be described, at least in part, in the general context of computer-executable instructions, such as program modules, being executed by a processor/controller. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Figure 2:
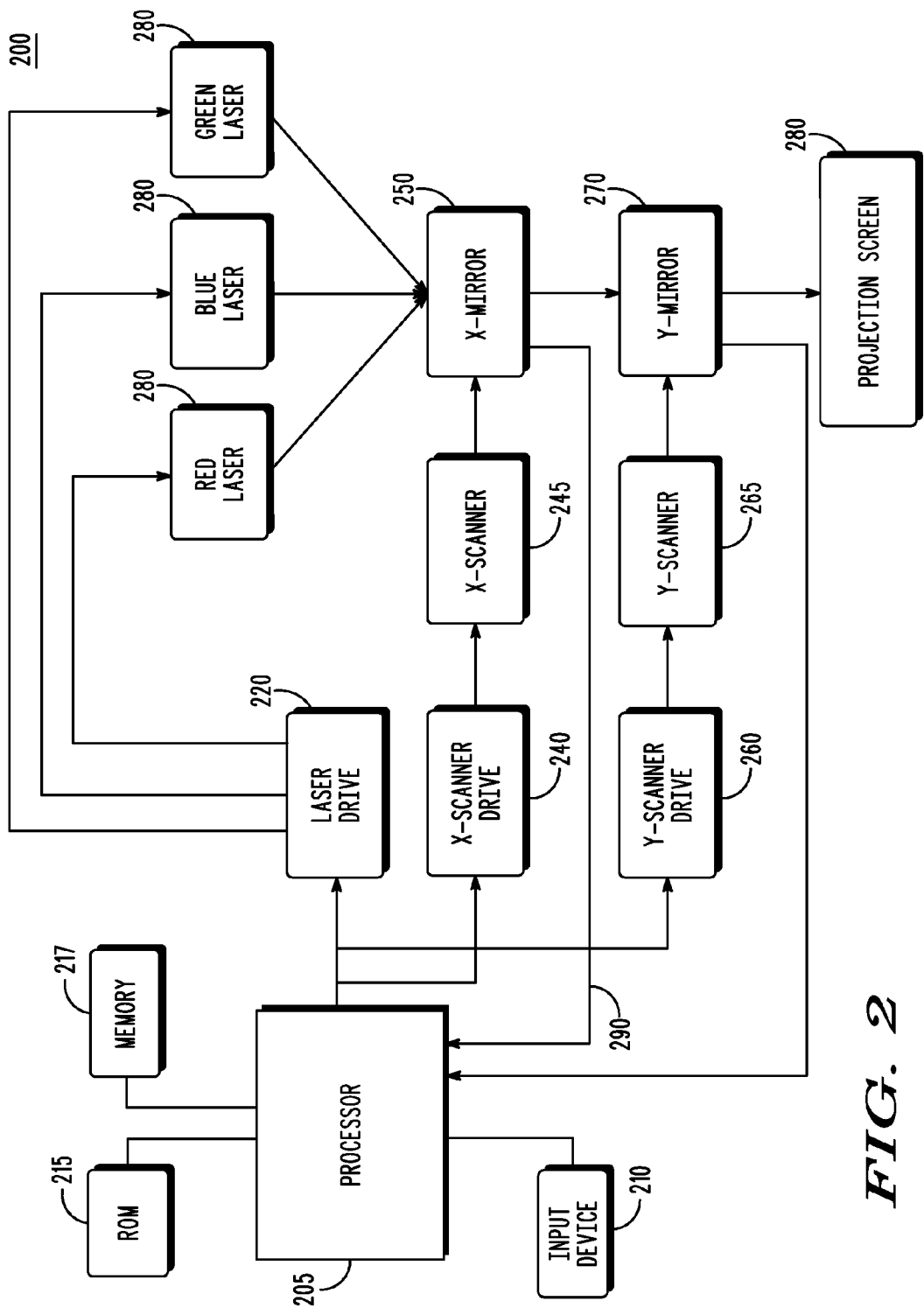
FIG. 2 is a block diagram of an image projection arrangement for installation in accordance with a possible embodiment of the invention.

FIG. 2 shows a more detailed exemplary block diagram of an image projection arrangement 200 which may implement one or more modules or functions of the laser power monitoring process. Three lasers 225, 230, 235 produce laser beams of different colors—red, blue and green—respectively. The laser beams are reflected by mirrors 250 and 270, the reflected beam is direct to screen 280 where a spot is formed. The light spots formed by each laser are superimposed on one another at screen 280. If more than one laser is powered simultaneously, then the spot on the screen 280 will have the mixed color of all the actuated lasers. The use of red, blue, and green lasers enables a wide range of colors to be formed. The spot of the desired color is swept in mutually orthogonal directions by the X-mirror 250 and Y-mirror 270. The mirrors are moved by the X-scanner 245 and the Y-scanner 265, respectively. The scanners are controlled by their respective drives 240 and 260. The laser drive 220 is connected to each laser and pulses the lasers (225, 230,235) on and off to form a bit-mapped image on screen 280. The color of the bit-mapped image is a function of the lasers that were actuated for each pixel of the image. Hence, the entire image can be colored all red, blue, or green, or any mixture of these colors. In addition, each pixel can be separately provided with a desired color so that the entire image comprises multiple colors.

A light source such as lasers 225, 230, and 235 energized by laser drive 220 emit a laser beam to a first X-mirror 250 oscillatable by an X-scanner 245 for horizontally moving the laser beam back and forth at a first sweep frequency along a first direction, commonly termed "X-axis" sweeping, and, in turn, to a second Y-mirror 270 oscillatable by a Y-scanner 265 for vertically moving the laser beam up and down at a second sweep frequency along a second direction, commonly termed "Y-axis" sweeping. The first and second directions are mutually orthogonal. The first or horizontal sweep frequency is generally much faster than the second or vertical sweep frequency. A control processor 205 is operative for controlling the X-scanner drive 240 and the Y-scanner drive 260 to insure that the X-mirror 250 and the Y-mirror 270 oscillate at the correct phases. An X-scanner feedback signal 290 and a Y-scanner feedback signal 295 transmit information about the mirror positions to processor 205 that monitors the sweep frequencies of the mirrors 250, 270 and controls the drives 240, 260 so as to maintain the rated phases. A crystal oscillator (not shown) serves as the master clock. In operation, a spot of focused light from the laser (225, 230, 235) is swept by the X-scanner 245 at the horizontal frequency along the X-direction to the end of the projection to form a first scan line. Thereupon, the Y-scanner 265 sweeps the spot at the vertical frequency along the Y-direction to form a second scan line.

The formation of successive scan lines proceeds in the same manner. In a preferred embodiment, for a display area or a projection screen 140 the resolution of the displayed image 160 in FIG. 1 is a function of the raster pixels along the height Y-direction) and pixels along the width X-direction).

The image 160 is created in the raster pattern by pulsing the lasers 225, 230, 235 on and off at selected times under the control of processor 205, which, in turn, controls the laser drive 220. The lasers 225-235 produce visible light and are turned on only when a pixel in the desired image is desired to be seen. Input device 210 provides content to be displayed as an image 160. An X-mirror feedback circuit and a Y-mirror feedback circuit (not shown) monitor the sweeps of the mirrors 250, 270 and assist the drives 240, 250 in maintaining the rated phases. The output signal 290 from the X-mirror feedback circuit is used by the control processor 205 to synchronize the signals to the X-scanner drive 240 and laser drive 220 with the position of the X-mirror 250.

Figure 3:
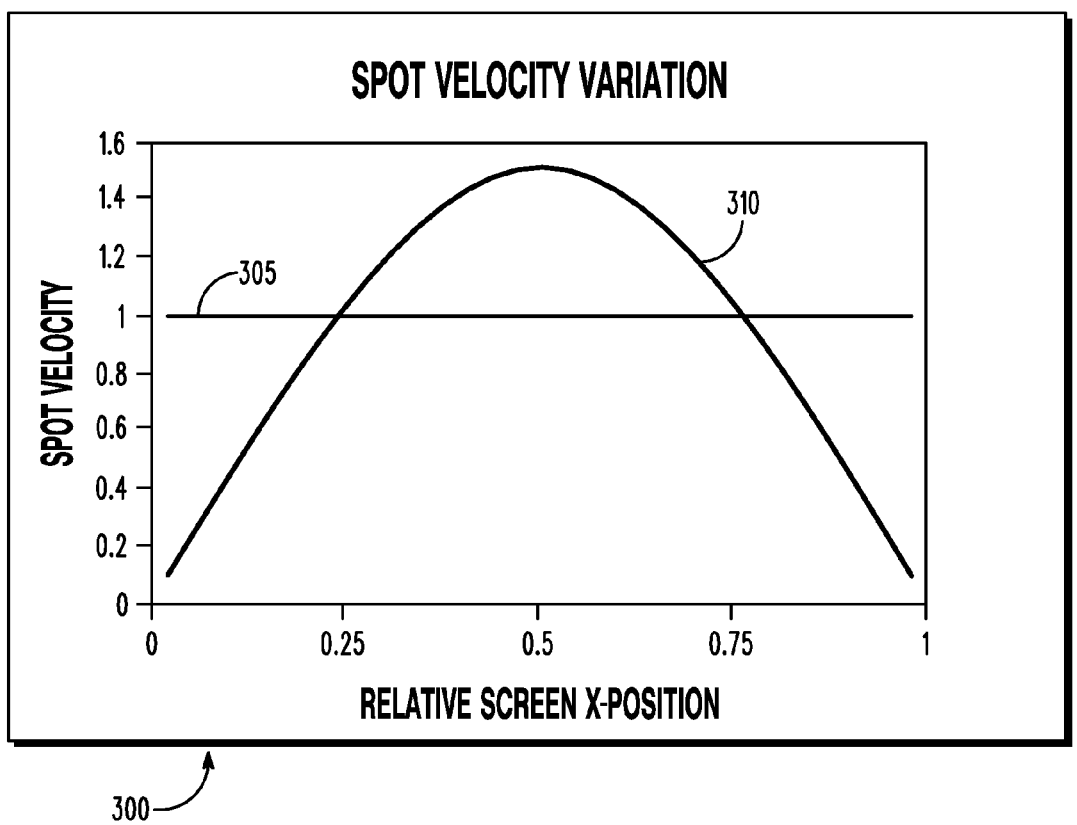
FIG. 3 is a graph of the moving velocity of spot generated by the laser beam on the screen.

In common practice the electromechanical combination of X-scanner 245 and X-mirror 250 commonly exhibits a strong electromechanical resonance versus the frequency of the applied electrical stimulus from X-scanner drive 240. For a fixed amplitude of the applied electrical stimulus from X-scanner drive 240, the amplitude of the displacement response of X-mirror 250 is a strong function of the frequency of this applied electrical stimulus, where the maximum amplitude of the displacement response occurs at a resonance frequency $\omega_O$. In order to minimize electrical drive power to X-scanner drive 340, X-scanner drive 240 is commonly driven by a sinusoidal waveform at the resonance frequency $\omega_O$. While the application of this sinusoidal frequency stimulus at $\omega_O$ achieves the target amplitude of displacement of the X-scanner 245 and X-mirror 250 with the least applied electrical power, the resultant displacement of X-mirror 250 becomes substantially sinusoidal in time. Consequently, the velocity of the laser beam that is swept across the projection surface also becomes substantially sinusoidal, exhibiting its highest velocity in the center of the screen, and its lowest velocities near the left and right sides of the screen. This is illustrated graphically by graph 300 at FIG. 3, where the spot velocities of both linear 305 and sinusoidal 310 sweeping are plotted versus the relative position on the screen, where the sinusoidal 310 sweep is defined to exhibit that same area over the span of the sweep as the linear sweep. It can be seen in FIG. 3 that the peak sinusoidal velocity is approximately 50% higher than the constant velocity of the linear sweep. In order to maintain a constant spot brightness across each horizontal line despite the sinusoidal velocity variations, the optical power to the lasers also needs to be modulated in a sinusoidal manner, outputting a peak laser power in the center of the screen, and reduced laser power near the left and right sides of the screen. Analyses have shown that the peak laser output power under this sinusoidal variation is approximately 50% higher than the constant laser output power that would be required to produce the same screen brightness if the velocity of the spot across each horizontal scan line were constant. Consequently, the peak drive current to each laser is also 50% higher than the constant drive current that would be required to produce the same screen brightness if the velocity of the spot across each horizontal scan line were constant. Since the radio frequency (RF) noise associated with the laser drive current is proportional to the magnitude of this current, the RF noise is also 50% higher than the RF noise that would be generated across for the same screen brightness if the velocity of the spot across each horizontal scan line were constant. This RF signal can interfere with the operation of electronic device 100. This noise, additionally, could exacerbate the problem of desense leading to a significant degradation of radio performance functions in electronic device 100. In general, desense is a loss of receiver sensitvity most often caused by a strong unintended signal that swamps or overloads portable device 110. Such a strong signal will cause the portable device phone) 110 to become practically non-functional. In such a condition portable device 110 can hardly respond to any weak signals. RF noise from the increase drive current will increase the potential for desense in portable device 110.

Figure 4:
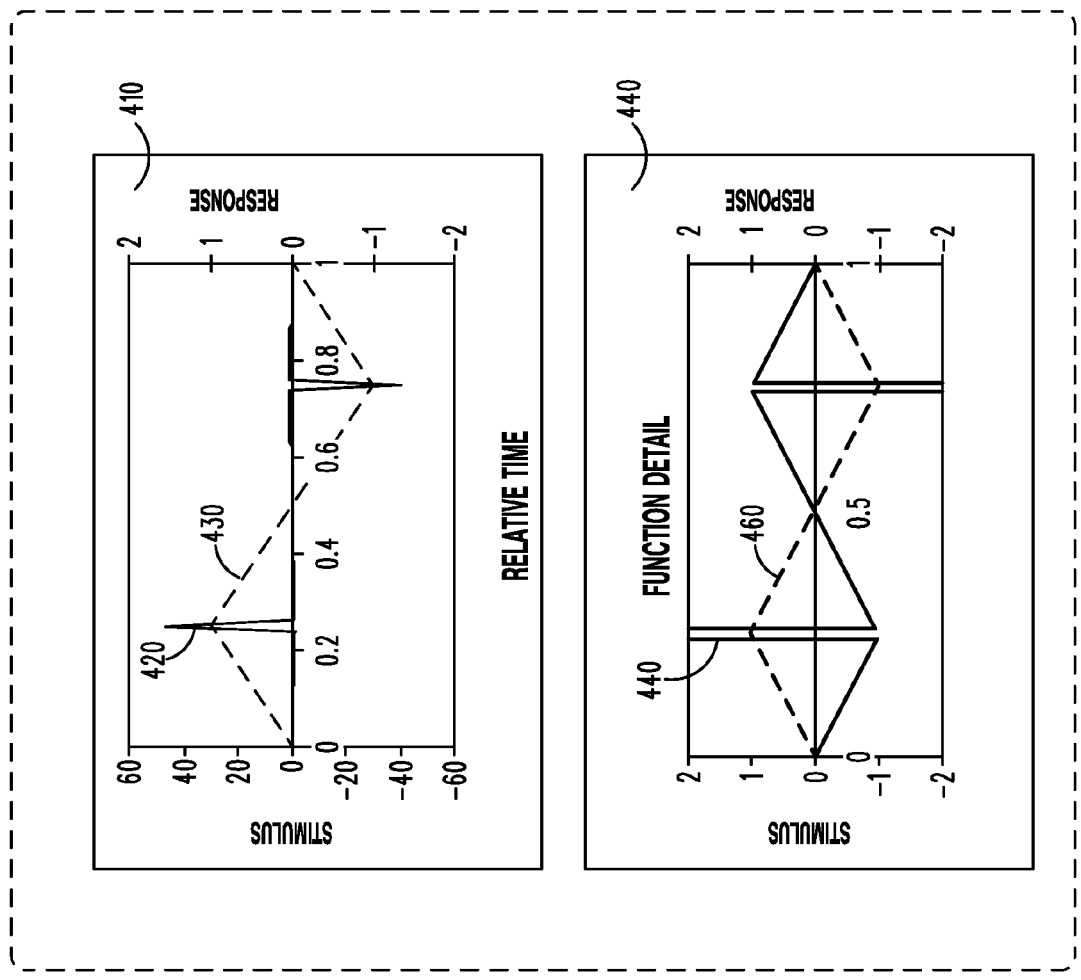
FIG. 4 shows a stimulus waveform adapted to provide a linear scanning motion in accordance to an embodiment.

There is a need to linearize the scanning pattern of X-mirror 250 because doing so leads to reduced peak laser power consumption, reduced peak laser drive current, and reduced RF noise. In the preferred embodiment, the linearity in the horizontal direction (x) is improved by driving the X-scanner 245 with a modified triangular waveform stimulus as shown in FIG. 4. This stimulus waveform will produce a near-linear response from X-scanner 245 and a near-linear sweep of the laser beam along the horizontal direction of the projection area 140.

The drive waveform is a modified triangular waveform in which the harmonics are defined in magnitude and phase to compensate for the natural sinusoidal response of the resonant X-mirror 250.

FIG. 4 is an exemplary stimulus waveform 400 in accordance with a possible embodiment of the invention. In particular, the first view 410 of the waveforms shows the stimulus signal 420 and response 430 from the X-mirror 240 in FIG. 2. A closer view 440 with smaller amplitude scale shows the stimulus signal 440 and response 460. The first view 410 shows the stimulus signal 420 as a triangular pulse waveform and the response 430 as a triangular waveform. The second view 440 clearly shows that the stimulus signal is a modified triangular waveform 440. The modified triangular waveform is 440 consists of a triangular waveform with a triangular pulse or spikes superimposed at certain intervals.

This stimulus waveform S(t) and the response R(t) can be mathematically described by the following equations:

$$S(t) = \sum_{m=1,3,5,\ldots}^{\infty} A_m \sin(m\omega_o t + \phi_m)$$  EQ. 1

$$A_m = \frac{(-1)^{(m-1)/2} 8}{\pi^2 m^2} \sqrt{\left(\left(\frac{1}{Q}\right)^2 + 1 - m^2\right)^2 + \left(\frac{2m}{Q}\right)^2}$$  EQ. 2

$$\phi_m = \tan^{-1}\left[\frac{2m}{Q\left(\left(\frac{1}{Q}\right)^2 + 1 - m^2\right)}\right]$$  EQ. 3

$$R(t) = \left(\frac{8}{\pi^2}\right) \sum_{m=1,3,5,\ldots}^{\infty} \frac{(-1)^{(m-1)/2}}{m^2} \sin(m\omega_o t)$$  EQ. 4

Where $A_m$ is an amplitude, $\phi_m$ is a phase, Q is the "Q factor", $\omega_O$ is the fundamental frequency of the X-scanner 245 plus X-mirror 240, t is time, and m is a summing index. As can be seen in equation 1, this stimulus pattern S(t) has a fundamental frequency of $\omega_O$, and has additional harmonics. The application of the stimulus pattern S(t) to X-scanner 244 will produce a near-linear response R(t) of the X-mirror 250. Stimulus waveform S(t) may be generated, for example, by a lookup table contained within ROM 215.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the embodiments in FIGS. 1-4, each processing the content in various possible ways. It does not necessarily need to be one system used by all end users. Accordingly, the appended claims and their legal equivalents should only define the invention, rather than any specific examples given.

We claim:

1. A method for projecting a two-dimensional image, the method comprising:
    emitting at least one laser beam;
        sweeping the laser beam with a first scan mirror along a first scan direction to form a scan line on the projection surface, and sweeping the scan line with a second scan mirror along a second scan direction generally orthogonal to the first scan direction to form a raster pattern of scan lines on the projection surface;
        driving the scanning means of the first scan mirror with a stimulus waveform, wherein the stimulus waveform has a fundamental frequency that is substantially equal to the resonance frequency of the first scanning means and contains harmonics of that resonance frequency to produce a substantially constant velocity of the swept laser beam on the projection surface along the first scanning direction; and
        causing selected pixels to be illuminated, and rendered visible, by the laser beam to produce the image;
    wherein the stimulus waveform is a combination of a first waveform and a second waveform and the second waveform is a pulse waveform.

2. The method of claim 1, the method further comprising:
    emitting respective laser beams of different wavelengths, and co-linearly arranging all of the laser beams into a composite beam directed at the first scan mirror.

3. The method of claim 1, wherein the first waveform is a triangular waveform.

4. An apparatus for projecting a two-dimensional image, the apparatus comprising:
    a laser for emitting a laser beam;
    a first scan mirror for sweeping the laser beam along a first scan direction to form a scan line on the projection surface, and a second scan mirror for sweeping the scan line along a second scan direction generally orthogonal to the first scan direction to form a raster pattern of scan lines on the projection surface;
    a driving circuit for driving a transducer attached to the first scan mirror with a stimulus waveform including harmonics, wherein the stimulus waveform has a fundamental frequency that is substantially equal to the resonance frequency of the transducer, and
    a controller for causing selected pixels to be illuminated, and rendered visible, by the laser beam to produce the image;
    wherein the stimulus waveform is a combination of a first waveform and a second waveform and the second waveform is a pulse waveform.

5. The apparatus of claim 4, the apparatus further comprising:
    additional lasers for emitting respective laser beams of different wavelengths, and co-linearly arranging all of the laser beams into a composite beam directed at the first scan mirror.

6. The apparatus of claim 4, wherein the first waveform is a triangular waveform.

7. An electronic device for projecting a two-dimensional image, the apparatus comprising:
    a laser for emitting a laser beam;
    a first scan mirror for sweeping the laser beam along a first scan direction to form a scan line on the projection surface, and a second scan mirror for sweeping the scan line along a second scan direction generally orthogonal to the first scan direction to form a raster pattern of scan lines on the projection surface;
    a driving circuit for driving a transducer attached to the first scan mirror with a stimulus waveform including harmonics, wherein the stimulus waveform has a fundamental frequency that is substantially equal to the resonance frequency of the transducer, and
    a controller for causing selected pixels to be illuminated, and rendered visible, by the laser beam to produce the image;
    wherein the stimulus waveform is a combination of a first waveform and a second waveform and the second waveform is a pulse waveform.

8. The apparatus of claim 7, the apparatus further comprising:
    additional lasers for emitting respective laser beams of different wavelengths, and co-linearly arranging all of the laser beams into a composite beam directed at the first scan mirror.

9. The apparatus of claim 7, wherein the first waveform is a triangular waveform.

* * * * *